April 4, 1961 L. A. STAMBAUGH 2,977,710
BAIT HARNESSES
Filed May 26, 1958
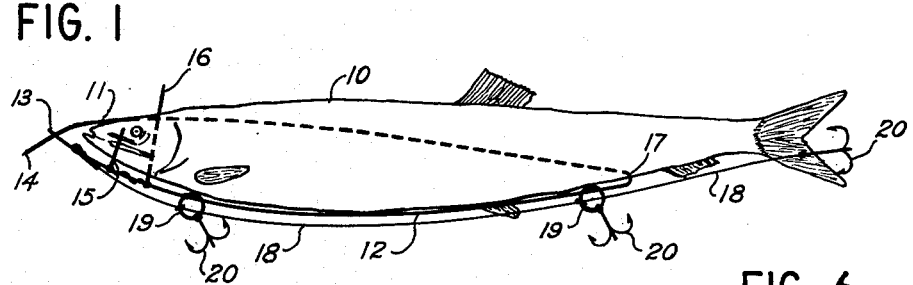
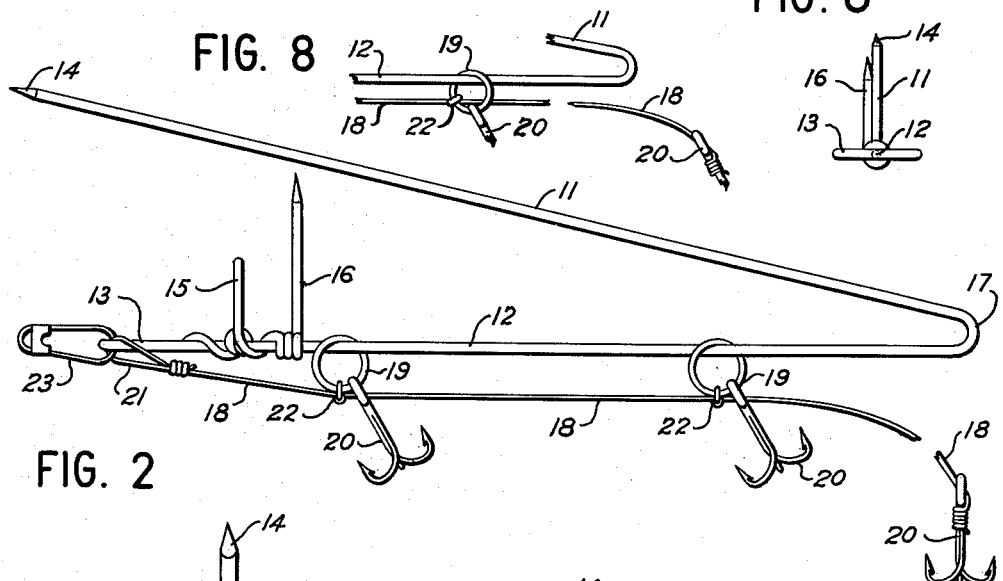
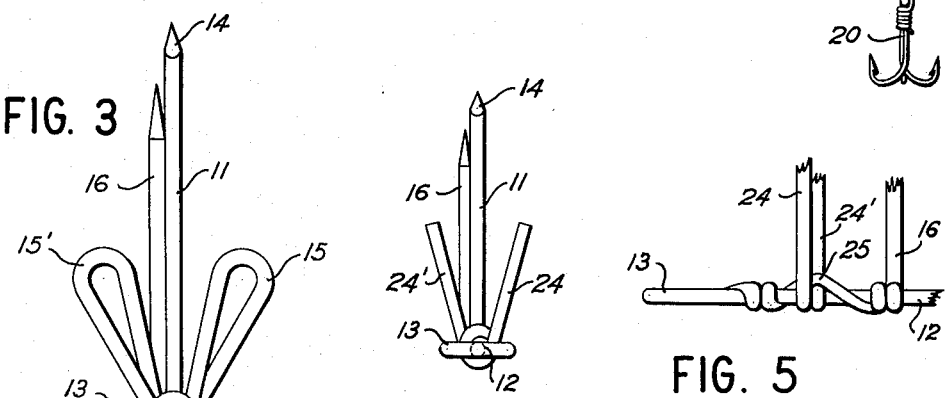
LLOYD A. STAMBAUGH
INVENTOR.
BY *Loyal H. M. Cartly*
ATTORNEY.

United States Patent Office 2,977,710
Patented Apr. 4, 1961

2,977,710

BAIT HARNESSES

Lloyd A. Stambaugh, Albany, Oreg., assignor of one-half to Alberta H. Stambaugh, Albany, Oreg.

Filed May 26, 1958, Ser. No. 737,806

8 Claims. (Cl. 43—44.2)

My invention relates to a device for retaining dead bait fish in a preferred attitude with relation to the water and hooks on the device. A fish may be securely retained in such a manner on my device that it will give the appearance of being injured but not dead while being trolled through the water and to have the hooks disposed along the surface of the fish's body in such a manner as to insure greatest effectiveness in catching a fish that may be enticed to take the bait.

One of the objects of my invention is to provide a wire frame unit, with or without a carrier element, that will securely retain a bait fish and that will dispose hooks at desired locations with respect to said fish bait.

A further object of my invention is to provide a bait harness that will be simple, effective and relatively inexpensive.

A still further object of my invention is to provide a bait harness that will secure the hook elements in such a manner that the strain exerted thereon by a hooked fish ordinarily will be transferred directly to the line without additional stresses on the wire frame unit of the harness.

Still another object of my invention is to provide a bait harness, upon which a bait fish may be easily and securely fastened, that will be quickly attachable to, or detachable from, a line.

Other and further objects of my invention will be apparent from the drawings, specification and claims herein.

Referring to the drawings:

Fig. 1 is a side view of the harness rigged with a bait fish.

Fig. 2 is a side view of the harness on an enlarged scale.

Fig. 3 is a front view on an enlarged scale of the main frame with one form of jaw-retaining element.

Fig. 4 is a front view of the main frame with an alternate form of jaw-retaining element.

Fig. 5 is a fragmentary side view of the main frame with the alternate form of jaw-retaining element shown in Fig. 4.

Fig. 6 is a front view of a modified form of main frame, the jaw-retaining element being eliminated.

Figs. 7 and 8 are fragmentary side views of a main frame, showing modified forms of the carrier element and hook rigging.

Fig. 9 is a fragmentary side view of a modified form of a bait harness shown without a carrier element.

Referring further to the drawings:

The device consists of a main frame unit formed into legs 11 and 12 which are disposed in vertical alignment and at an acute angle with each other through having been bent back toward each other at 17. The leg 11 diverges upwardly and away from the leg 12 in its same plane and terminates in a point 14. The leg 12 has a loop or eye 13 formed in its forward end. Behind the loop 13 jaw-retaining elements 15 are formed on each side of the leg 12 at an acute angle with respect to each other. Immediately behind the jaw-retaining elements 15 a single head spike element 16 is formed to project upwardly at approximately a 90° angle to the leg 12. The head spike element also terminates in a sharp point. The main frame unit consisting of the leg 11, the leg 12, the eye 13, the jaw-retaining elements 15 and the head spike 16 may be formed from one continuous piece of stock, preferably of spring steel. When so formed the jaw-retaining elements 15 will be arranged in the manner best seen in Figs. 2 and 3. An alternate form of the jaw-retaining element is shown in Figs. 4 and 5 in which the one-wire element 24—24' constitutes the jaw-retaining element; it is formed from a separate piece of wire from that used to form the legs 11 and 12. When the main unit is arranged in two pieces to form the jaw-retaining element 24—24', the portion of the leg 12 remaining after twisting it around itself to form the eye 13 will be threaded, as at 25, between the elements 24 and 24', which have been formed by looping, winding or twisting the stock from which it is made around the leg 12. It will then again be twisted around the leg 12 behind the elements 24 and 24' to form the head spike 16 in substantially the same relationship to the leg 12, leg 11 and the jaw-retaining elements 24 and 24' as it occupies in relation to those elements in which the loop-shaped, jaw-retaining elements 15 are formed from the same piece of stock as the rest of the main frame. The element 24—24' may be secured to leg 12 by twisting the wire stocks together, by soldering, or both, etc.

A carrier element 18 of leader, fine wire, cable, chain, etc., has its fore end formed into a loop or eye 21 which is positioned approximately even with the eye 13 of the main frame unit. The carrier element 18 extends rearwardly beyond the bend 17 of the main frame unit and is provided with, preferably, a triple hook 20 at its rearmost end. Medially of the eye 21 and the hook 18 a plurality of rings 19 are slidably threaded upon the leg 12 between the head spike 16 and the bend 17 and are retained in spaced relationship to each other upon the leg 12 by means of knots, twists, etc., 22 in the carrier 18 and around each of said rings 19. Each ring 19 also carries a hook 20, preferably triple pointed. In a modified version one ring alone may be threaded upon the leg 12 and secured in a predetermined relation thereto by attachment to the carrier 18. A standard quickly detachable fastener device 23 interlocks through the eye 21 of the carrier 18 and the eye 13 of the leg 12, so that the line, wire or snelled leader, other fishing tackle, etc., which has been fastened to the opposite end of the element 23 will exert a substantially equal pull on both the carrier 18 and the leg 12 of the main frame unit. By this arrangement a hooked fish is primarily pulled through the medium of the carrier element 18, the main frame unit of the bait harness only coming into play in a secondary manner in most instances. However, should the carrier 18 break ahead of any ring 19, the bend 17 of the main frame unit would prevent the hook 20 on the ring or rings 19 from being entirely lost; and, hence, chances of losing a hooked fish would be greatly reduced.

In using my bait harness the point 14 of the leg 11 is inserted into the body of the bait fish 10 toward the tail portion thereof and is forced therethrough in such a direction that the leg 11 will emerge, preferably, at a point between the eyes and nose of the head of the bait. The leg 12 will then be disposed to leg 11 with a portion of the fish's body between it and said leg 11. The pointed head spike 16 is forced through the head of the bait 10, and the jaw-retaining elements 15, or 24—24', are pressed around the bait fish's jaws until the head spike 16 emerges through the head of the bait. The end 14 of the leg 11 is then inserted through the eye 13 at the forward end of the leg 12. This securely locks the bait fish 10 in any one of a number of positions in which the fisherman may desire to place it. The hooks 20 which are carried by the rings 19, as shown in the drawings, are arranged in such a manner that they will be positioned at desirable points along the body of the bait fish; and the hook 20, fastened at the rearmost end of the carrier element 18, will trail at some desired point in the vicinity of the fish's tail while trolling. In the version of my bait harness employing a carrier element the fastener 23 loops through the eyes 21 and 13 of both the carrier element 18 and leg 12, carrying them at its rearmost end while its forward end is fastened to the fish line, etc.

As shown in Figs. 6, 7, 8 and 9 the bait harness may be modified by eliminating the jaw-retaining elements 15 or 24—24' as best seen in Fig. 6, or by eliminating the portion of the carrier element 18 extended rearwardly of the main frame unit together with the hook 20 secured thereon, as best seen in Fig. 7, or by limiting the rings 19 and the hooks 20 carried thereby to a single ring and hook arrangement on the leg 12, as seen in Fig. 8, or by eliminating the carrier element 18 altogether and securing a plurality of rings 19 carrying hooks 20 directly to the leg 12 in the desired relative position thereto by any suitable means, such as wiring, tying, etc., as seen in Fig. 9.

It is understood that by varying the manner of inserting the leg 11 through the body of a fish 10 the fish may be made to assume various attitudes of injury or disability while being trolled. It is, also, understood that variations in materials or from the preferred embodiments, as set forth herein, may be made without departing from the spirit or scope of my invention and that I am not limiting myself to the specific embodiments herein set forth.

Having thus described my invention, I claim:

1. In a bait harness: a main frame unit formed from a single piece into a substantially V-shape with the apex of the V-shape being the rearmost end consisting of two legs, one a pointed upper leg disposed above and at an acute angle to the other and lower leg, said lower leg having formed in the plane thereof at its forward end an eye, rigid jaw-retaining elements disposed at an acute angle to each other projecting upwardly and laterally from said lower leg behind said eye and a pointed head spike adapted to pass through the head of a bait fish and projected upwardly from said lower leg behind said jaw-retaining elements, said upper leg being adapted to pass through the body of a bait fish and to have its pointed end inserted through the eye of said lower leg; a flexible carrier element with an eye at its forward end, said carrier extending throughout the length of and rearwardly of the said main frame unit substantially along the said lower leg thereof with its said eye secured to the eye of said lower leg; a hook secured to the rearmost end of said carrier element; a plurality of rings slidably threaded upon the lower leg of the main frame unit medially of said head spike and said rearmost end, said slidably threaded rings being secured by said carrier element at selected spaced positions therealong; and a hook carried by each of said rings.

2. In a bait harness: a main frame unit formed from a single piece into a substantially V-shape with the apex of the V-shape being the rearmost end consisting of two legs, one a pointed upper leg disposed above and at an acute angle to the other and lower leg, said lower leg having formed in the plane thereof at its forward end an eye and a pointed head spike adapted to pass through the head of a bait fish and projected upwardly from said lower leg behind said eye, said upper leg being adapted to pass through the body of a bait fish and to have its pointed end inserted through the eye of said lower leg; a separate and rigid jaw-retaining element secured to said lower leg of the main frame unit between the eye and head spike elements thereof; a flexible carrier element with an eye at its forward end, said carrier extending throughout the length of and rearwardly of the said main frame unit substantially along the said lower leg thereof with its said eye secured to the eye of said lower leg; a hook secured to the rearmost end of said carrier element; a plurality of rings slidably threaded upon the lower leg of the main frame unit medially of said head spike and said rearmost end, said slidably threaded rings being secured by said carrier element at selected spaced positions therealong; and a hook carried by each of said rings.

3. In a bait harness: a main frame unit formed from a single piece into a substantially V-shape with the apex of the V-shape being the rearmost end consisting of two legs, one a pointed upper leg disposed above and at an acute angle to the other and lower leg, said lower leg having formed in the plane thereof at its forward end an eye, fixed jaw-retaining elements disposed at an acute angle to each other projecting upwardly and laterally from said lower leg behind said eye and a pointed head spike adapted to pass through the head of a bait fish and projected upwardly from said lower leg behind said jaw-retaining elements, said upper leg being adapted to pass through the body of a bait fish and to have its pointed end inserted through the eye of said lower leg; a carrier element with an eye at its forward end, said carrier extending to the rearmost end of the said main frame unit substantially along the lower leg thereof and said eye secured to the eye of said lower leg; a plurality of rings slidably threaded upon the lower leg of the main frame unit medially of said head spike and said rearmost end, said rings being secured by said carrier element at selected spaced positions therealong; and a hook carried by each of said rings.

4. In a bait harness: a main frame unit formed from a single piece into a substantially V-shape with the apex of the V-shape being the rearmost end consisting of two legs, one a pointed upper leg disposed above and at an acute angle to the other and lower leg, said lower leg having formed in the plane thereof at its forward end an eye and a pointed head spike adapted to pass through the head of a bait fish and projected upwardly from said lower leg behind said eye, said upper leg being adapted to pass through the body of a bait fish and to have its pointed end inserted through the eye of said lower leg; a separate and fixed jaw-retaining element secured to said lower leg of the main frame unit between the eye and head spike elements thereof; a carrier element with an eye at its forward end, said carrier extending to the rearmost end of the said main frame unit substantially along the lower leg thereof and said eye secured to the eye of said lower leg; a plurality of rings slidably threaded upon the lower leg of the main frame unit medially of said head spike and said rearmost end, said rings being secured by said carrier element at spaced positions therealong; and a hook carried by each of said rings.

5. In a bait harness: a main frame unit formed from a single piece into a substantially V-shape with the apex of the V-shape being the rearmost end consisting of two legs, one a pointed upper leg disposed above and at an acute angle to the other and lower leg, said lower leg having formed in the plane thereof at its forward end an eye, fixed jaw-retaining elements disposed at an acute angle to each other projecting upwardly and laterally from said lower leg behind said eye and a pointed head spike adapted to pass through the head of a bait fish and projected upwardly from said lower leg behind said jaw-retaining elements, said upper leg being adapted to pass through the body of a bait fish and to have its pointed end inserted through the eye of said lower leg; a carrier element with an eye at its forward end, said carrier extending rearwardly of the said main frame unit substantially along the lower leg thereof with its said eye secured to the eye of said lower leg; a hook secured to the rearmost end of said carrier element; a single ring slidably threaded upon the lower leg of the main frame unit medially of said head spike and said rearmost end, said ring being secured by said carrier element at a predetermined position thereof; and a hook carried by said ring.

6. In a bait harness: a main frame unit formed from a single piece into a substantially V-shape with the apex of the V-shape being the rearmost end consisting of two legs, one a pointed upper leg disposed above and at an acute angle to the other and lower leg, said lower leg having formed in the plane thereof at its forward end an eye and a pointed head spike adapted to pass through the head of a bait fish and projected upwardly from said lower leg behind said eye, said upper leg being adapted to pass through the body of a bait fish and to have its pointed end inserted through the eye of said lower leg; a separate and fixed jaw-retaining element secured to said lower leg of the main frame unit between the eye and head spike elements thereof; a carrier element with an eye at its forward end, said carrier extending rearwardly of the said main frame unit substantially along the lower leg thereof with its said eye secured to the eye of said lower leg; a hook secured to the rearmost end of said carrier element; a single ring slidably threaded upon the lower leg of the main frame unit medially of said head spike and said rearmost end, said ring being secured at a predetermined position of said carrier element; and a hook carried by said ring.

7. In a bait harness: a main frame unit formed from a single piece into a substantially V-shape, with the apex of the V-shape being the rearmost end, consisting of two legs, one a pointed upper leg disposed above and at an acute angle to the other and lower leg, said lower leg having formed in the plane thereof at its forward end an eye, fixed jaw-retaining elements disposed at an acute angle to each other projecting upwardly and laterally from said lower leg behind said eye and a pointed head spike adapted to pass through the head of a bait fish and projected upwardly from said lower leg behind said jaw-retaining elements, said upper leg being adapted to pass through the body of a bait fish and to have its pointed end inserted through the eye of said lower leg; a plurality of rings slidably threaded upon the lower leg of the main frame unit medially of said head spike and said rearmost end, said rings being secured on said lower leg in spaced relation to each other; and a hook carried by each of said rings.

8. In a bait harness: a main frame unit formed from a single piece into a substantially V-shape, with the apex of the V-shape being the rearmost end, consisting of two legs, one a pointed upper leg disposed above and at an acute angle to the other and lower leg, said lower leg having formed in the plane thereof at its forward end an eye and a pointed head spike adapted to pass through the head of a bait fish and projected upwardly from said lower leg behind said eye, said upper leg being adapted to pass through the body of a bait fish and to have its pointed end inserted through the eye of said lower leg; a separate and fixed jaw-retaining element secured to said lower leg of the main frame unit between the eye and head spike elements thereof; a plurality of rings slidably threaded upon the lower leg of the main frame unit medially of said head spike and said rearmost end, said rings being secured to said lower leg in spaced relation to each other; and a hook carried by each of said rings.

References Cited in the file of this patent

UNITED STATES PATENTS

| | | |
|---|---|---|
| 2,196,376 | Anderson | Apr. 9, 1940 |
| 2,207,319 | Hollopeter | July 9, 1940 |
| 2,565,660 | Krilich | Aug. 28, 1951 |
| 2,755,593 | Thurman | July 24, 1956 |
| 2,797,522 | Friederich | July 2, 1957 |

FOREIGN PATENTS

| | | |
|---|---|---|
| 1,129,128 | France | Sept. 3, 1956 |